Jan. 21, 1964  J. COMTE  3,118,574
APPARATUS FOR CONTROLLING THE DOWNFLOW
OF A COLUMN OF DIVIDED MATERIAL
Filed April 25, 1960  4 Sheets-Sheet 1
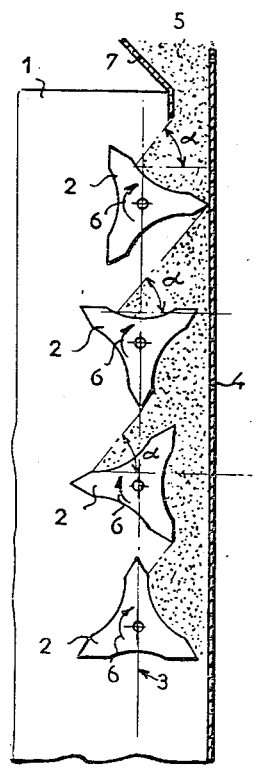
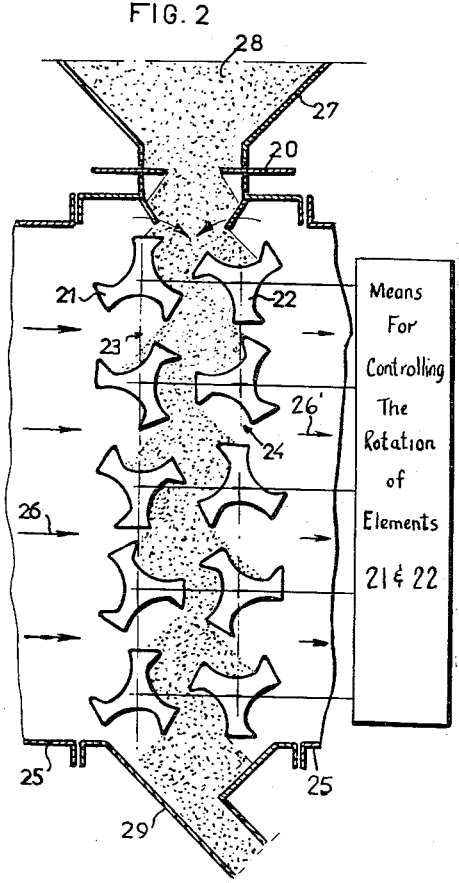

Jan. 21, 1964  J. COMTE  3,118,574
APPARATUS FOR CONTROLLING THE DOWNFLOW
OF A COLUMN OF DIVIDED MATERIAL
Filed April 25, 1960  4 Sheets-Sheet 4

United States Patent Office 3,118,574
Patented Jan. 21, 1964

3,118,574
APPARATUS FOR CONTROLLING THE DOWN-
FLOW OF A COLUMN OF DIVIDED MATERIAL
Jean Comte, Longeville-les-Metz, Moselle, France, as-
signor to Societe Alsacienne de Constructions Meca-
niques Lorsid, Moselle, France, a company of France
Filed Apr. 25, 1960, Ser. No. 24,379
Claims priority, application France Apr. 23, 1959
4 Claims. (Cl. 222—270)

This invention relates to the handling and processing of divided materials. In many industrial processes it is desired to feed ground, crushed, comminuted solid or semi-solid substances (hereinafter all designated by the generic term "divided materials") along a descending path at a controlled rate. In many cases it is desired simultaneously to cause the material to interact, as it descends, with a stream of liquid or gaseous fluid.

Conventional systems used for the purposes just specified have usually included bucket conveyors and distributor or feeder devices of various types. Such systems tend to be complicated if they are to control the feed rate smoothly and effectively. Moreover, they do not generally permit of imparting a desired permeability to the column of material at all levels thereof, with a uniform homogeneity throughout the vertical extent of the column. Such a condition, however, is essential where the substance is to be acted upon by a transverse stream of fluid, since otherwise the fluid would tend to pass exclusively through the less compact sections of the column and the resulting treatment would be lacking in uniformity.

Even in those cases where no particular interaction between the material and a fluid is required during the downward feed motion, it is desirable to maintain uniform compacity promoting smooth flow of the substance and averting the formation of hard plugs therein.

Objects of the invention, therefore, are to provide a system controlling the rate of descent of a column, sheet or vein of divided material that will be effective yet simple, rugged and economical; to provide an improved means of producing interaction between a moving mass of divided material and a stream of fluid; and to control the downward feed of divided materials in a smooth and regular manner.

According to one aspect of the invention there is provided, in apparatus for controlling the downward feed of a column of divided material, an array of generally vertically-spaced, horizontally-extending vaned elements rotatable about parallel axes transverse to said column and bounding one side thereof, and means defining a boundary for the opposite side of said column, the spacing between adjacent elements of said array being so selected that a segment of said column defined between a pair of adjacent elements will at any time have at least a major part thereof supported upon a vane of the lower element of the pair. Preferably, the said opposite side of the column is likewise bounded by a similar and symmetrical array of rotatable vaned elements. The elements of each array are preferably rotated in inward directions so as to contribute to the retention of the material within the column. A stream of fluid may, if desired, be circulated over a path normal to the column through the spaces defined between said elements and through the column of material, to interact therewith.

The above and further objects, aspects and features of the invention will appear as the description proceeds with reference to the accompanying drawings which show embodiments of the invention presented by way of illustration but not of limitation. In the drawings:

FIG. 1 is a simplified vertical sectional view of a material feed control system of the invention in one simple form thereof;

FIG. 2 is a similar view of another embodiment;

Figure 3D:
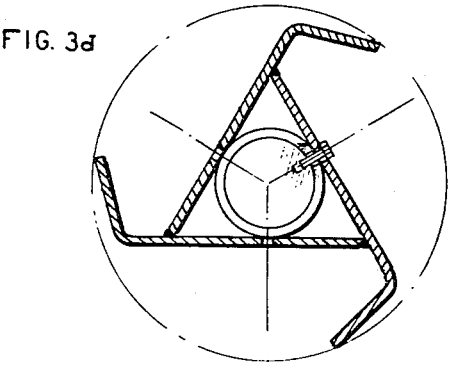
FIGS. 3a, 3b, 3c and 3d are cross sectional views on a larger scale showing various forms of multivaned elements usable in carrying out the invention.

A material feeding system according to the invention generally comprises means defining a vertical conduit of rectangular cross section. Those two vertical walls of this conduit that are parallel to the plane of the drawing in FIG. 1, one of which is designated 1, may be flat and smooth. Journalled on shafts extending across the opposite walls just mentioned is an array of vertically spaced rotatable three-vaned elements 2 which provide in effect a perforate wall which is generally designated 3. The fourth vertical wall of the conduit, opposite the perforate wall 3, is solid as shown at 4 in this figure. The dimensioning is such that the tips of the vanes of the elements 2 just clear the surface of wall 4, as is apparent for the uppermost element, so that the divided material 5 is unable to pass freely therebetween. Further, the elements are so dimensioned and spaced with regard to the particular consistency and character of the material being handled, that the body of material defined between adjacent elements of the array, when positioned with its natural slope angle (as shown at α in FIG. 1) upon the lower element of the pair of adjacent element, has at least a major portion thereof supported on said lower element and will not tend to overflow outwardly thereof. A hopper 5 is shown at the top of the system for feeding material thereto.

The three-vaned elements 2 are, in this example, all rotated simultaneously in the directions indicated by the arrows 6 from power means (see, for example, FIG. 2). The elements are angularly displaced with respect to one another along the array, as is clearly indicated in the drawing, so that at any particular time there will always be one or more of the elements positioned with one of its vanes adjacent the opposing wall 4, as is shown for the uppermost and lowermost elements in FIG. 1, whereby free fall of the mass of divided material through the system will at all times be positively prevented.

In the embodiment of the invention shown in FIG. 2, the feed control system comprises two similar arrays of three-vaned elements 21 and 22 rotatable about geometrical axes which are disposed in parallel vertical planes 23 and 24 respectively. A feed hopper 27 controlled by a gate 20 is provided at the top of the system to feed the body of divided material 28 into the space between the arrays of elements. A bottom outlet 29 is provided for discharging the material. In this construction, the elements 21 and 22 with the hopper 27 and outlet 29 form part of an intermediate conduit section which is interposed in a conduit 25 along which fluid is circulated so that it flows from the left as shown by arrows 26, through the spaces between the elements 21 of the lefthand array, through the mass of divided material between the arrays through the spaces between the right-hand elements 22 and outwards along the arrows 26'. In the dual-array construction of FIG. 2, the elements 21 and 22 of both sets may be rotated through suitable means in the directions indicated by the arcuate arrows, that is in such directions that the vanes of the elements tend to retain the particles of material within the column defined between the two sets of elements, rather than tending to move the material outwards. The spacing between the elements of both sets and the dimensioning and relative setting of the vaned elements are such that the material is prevented from descending freely in a solid and continuous sheet between the two sets; instead the body of material is in effect divided into segments each of which is supported, wholly or in respect to a substantial portion thereof, upon a vaned element of each respective set, with the material assuming its natural slope angle there on as described in connection with FIG. 1.

Figure 3C:
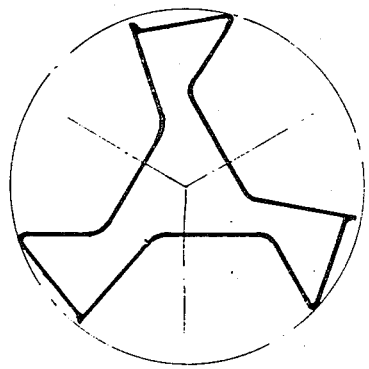
Figure 3A:
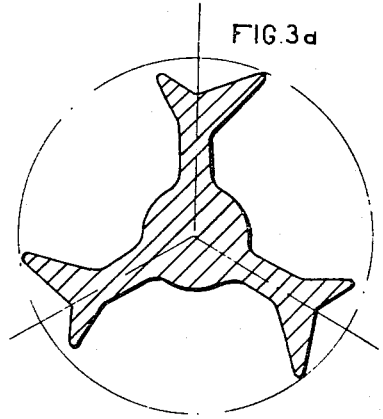
Figure 3B:
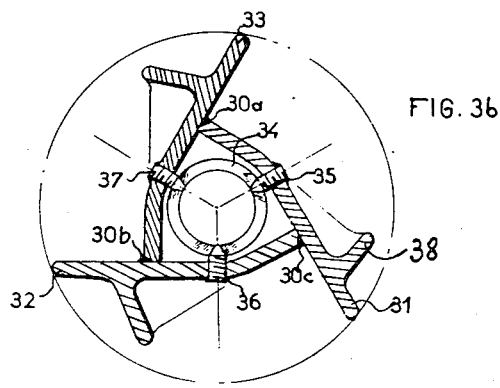

The vaned elements may assume any of a variety of shapes in cross sectional contour and may be constructed in any desired manner. While very satisfactory result have been obtained with three-vaned elements and for this reason three-vaned elements have been exclusively shown herein, it will be evident that each element may be formed with more or less vanes than three if desired. A particularly simple cross sectional contour is illustrated in FIG. 1 as being in the general shape of an equilateral triangle with generally concave sides. In FIG. 2, the elements are asymmetrical, each vane being formed with an oblique flange extending generally in the direction of rotation. FIG. 3c illustrates a similar cross sectional contour but made from press-formed, welded sheeting. FIG. 3d shows a similar element produced by means of three sheets secured, e.g. with screws, around a tubular core and welded to one another. FIG. 3a shows a somewhat more elaborate shape which may conveniently be produced as a one-piece casting. In this case, each vane terminates in two diverging oblique flanges of unequal length, with the longer one extending in the direction of rotation of the element. FIG. 3b shows a further element made up from three profiled or cast parts secured around a tubular core 34 with screws 37, and welded to one another at 30a, b and c, somewhat as in FIG. 3d. Each vane 31, 32, 33 has a flange extending rearwardly therefrom.

Figure 4:
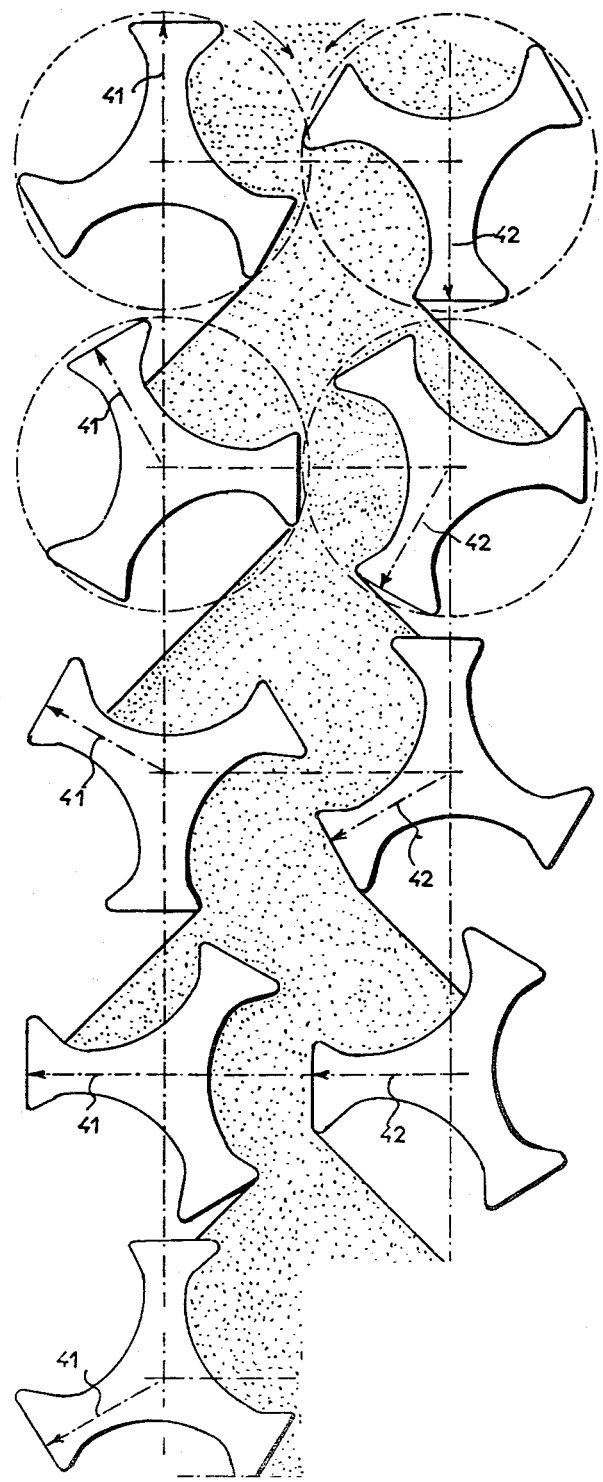
FIG. 4 is a large-scale, simplified vertical view of a system generally similar to that of FIG. 2 and illustrating certain further features of the invention.

As indicated with reference to FIG. 1, the elements of a given vertical array are preferably angularly displaced with respect to the other. Where two parallel spaced vertical arrays of rotatable elements are used as in FIG. 2, moreover, the elements of the respective sets placed at a common level are also preferably angularly displaced from each other. FIG. 4 illustrates in greater detail the geometrical relationships present in such a system. With the three-vaned elements shown, the angular displacement between adjacent elements of each set may desirably be 30°, such displacement increasing continually down the array as indicated by the arrows 41 for the left-hand array and 42 for the right-hand one. It will also be seen that the circular areas swept by the vane tips of opposite elements are shown slightly overlapping, although this is not essential. The material is thus subjected to a vigorous mixing action during its descent and is maintained homogeneous throughout.

Although the elements may be positively driven in rotation by power means as stated earlier, in some cases it may be desirable not to provide mechanical means for rotating the elements but to allow them simply to revolve under the action of the weight of the downflowing material. It may frequently be desirable to provide means for retarding the rotation of the elements by the action of the material in order to control the rate of feed of the latter. In other circumstances it may be advantageous to rotate the elements at different velocities along the vertical array, and/or to subject the elements to braking forces of different strength. Thus, where the material is gradually made to interact with a fluid flowing across it as described with reference to FIG. 2, the character of the material may change gradually along its path as a consequence of such interaction; for example, where the fluid is heated air and serves to dry the material, the material may gradually grow less and less compact as the drying progresses. In other cases, the interacting fluid may be such as to combine chemically and/or physically with the material being processed, so that the material grows progressively more compact as it proceeds on its downward path. In all such and similar cases it may be necessary to vary the driving and/or retarding torque applied to the elements along the length of the arrays in order to maintain a smooth and continuous downflow of the material while at the same time maintaining a substantially uniform degree of permeability in the mass of the material.

Figure 5:
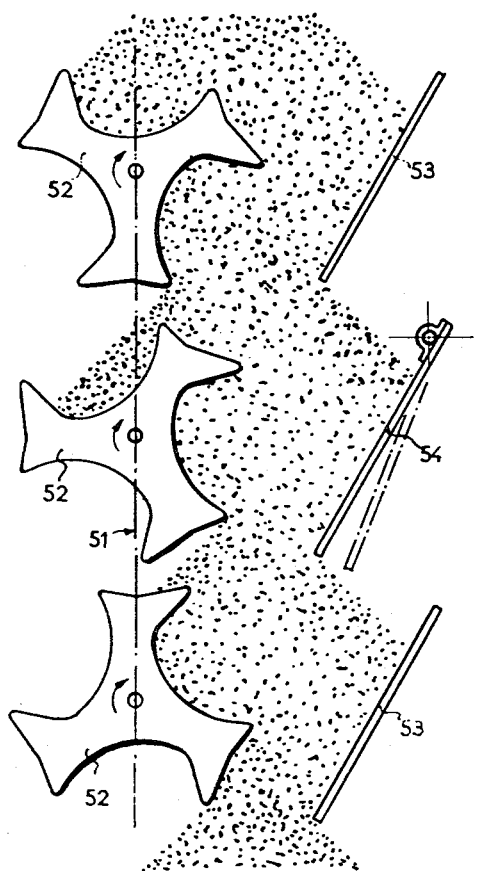
FIGS. 5 and 6 are partial views similar to that of FIG. 4 but differing therefrom in scale, and illustrating further modifications.

In the modified construction shown in FIG. 5, the system includes one set of rotatable elements 52 having their axes in a common vertical plane 51, while the opposite wall is defined by a set of inclined slats. As shown, the slats are alternately stationary as at 53 and pivoted as shown for the slat 54. The pivotable slats may have spring or counterweight means associated therewith, so as to permit the slats to be deflected to a position as shown in chain-lines for the slat 54, e.g. in case of an overload. The slats constitute a set of louvres through which interacting fluid may be circulated as previously described.

Figure 6:
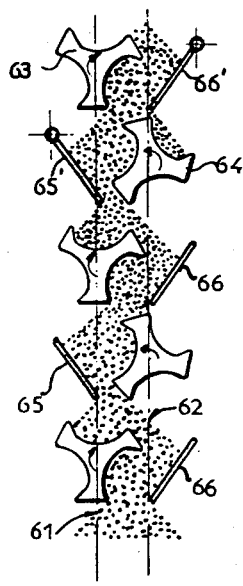

In the further modification shown in FIG. 6 both sides of the vertical column of material are bounded by similar arrays each comprising in alternate relation multi-vaned rotatable elements such as 63 and 64 respectively, and inclined slats. The slats in turn may alternately include stationary slats such as 65 and 66 respectively, and rockable slats such as 65' and 66, 66' respectively.

While a number of modifications have been illustrated and described it will be apparent that these are by no means exhaustive and that various other forms of the invention may be developed by those familiar with the art on the basis of the teachings disclosed herein. Thus, the multi-vaned elements may be recessed and have heating and/or cooling means incorporated therein, and/or means for delivering thereinto a further treating fluid for addition to the mass of divided material through perforations provided in the walls of the recessed elements.

The rotatable elements may be driven continuously or intermittently, simultaneously or in a predetermined sequence. Further, one of the vertical walls of the column of descending material may be provided by a simple grating or perforate sheet, where the consistency and granulometry of the material being processed allows of this. In the type of construction illustrated in FIGS. 2 and 4, the elements in the respective arrays may be vertically offset rather than being provided at common levels as shown.

What is claimed is:

1. An apparatus for controlling the downflow of a column of divided material, said apparatus comprising two horizontally spaced arrays each including a plurality of vertically spaced flow control elements rotatable about respective horizontal parallel axes, each rotatable element of one array being arranged opposite a corresponding element of the other array to form therewith a pair of corresponding elements, each element having a plurality of vanes extending substantially radially about the horizontal axis of the element and arranged at equal angular distances from each other about said axis; means for rotating the two elements of each pair and maintaining the vanes of one element in an angularly shifted position with respect to the vanes of the other element of the pair during rotation, so as to cause said material to flow downwardly at a controlled rate along a path of continuously varying shape and section, defined between said two arrays; inlet means for introducing said material above the uppermost pair of opposed rotatable elements; and outlet means for evacuating said material below the lowermost pair of elements.

2. An apparatus for controlling the downflow of a column of divided material, said apparatus comprising two horizontally spaced arrays each including a plurality of vertically spaced flow control elements rotatable about respective horizontal parallel axes, each rotatable element of one array being arranged opposite a corresponding element of the other array to form therewith a pair of corresponding elements, each element having a plurality of vanes extending substantially radially about the horizontal axis of the element and arranged at equal angular distances from each other about said axis; means for synchronously rotating the elements of said arrays and maintaining the vanes of each element of each array in an angularly shifted position with respect to the adjacent elements of said array and with respect to the corresponding opposed element of the other array during rotation, so as to cause said material to flow downwardly at a controlled rate along a path of continuously varying shape and section, defined between said two arrays; inlet means for introducing said material above the uppermost pair of opposed rotatable elements; and outlet means for evacuating said material below the lowermost pair of elements.

3. The apparatus according to claim 1, wherein the horizontal spacing of the opposed elements of each pair is such that the circular path of the outer ends of the vanes of one element of the pair slightly overlaps the circular path of the outer ends of the vanes of the other element of the path.

4. The apparatus according to claim 2, wherein the horizontal spacing of the opposed elements of each pair is such that the circular path of the outer ends of the vanes of one element of the pair slightly overlaps the circular path of the outer ends of the vanes of the other element of the path.

References Cited in the file of this patent

UNITED STATES PATENTS

| | | |
|---|---|---|
| 1,032,132 | Gormley | July 7, 1912 |
| 1,349,221 | Nolen | Aug. 10, 1920 |
| 1,483,703 | Wever | Feb. 12, 1924 |
| 1,796,324 | Farnham | Mar. 17, 1931 |

FOREIGN PATENTS

| | | |
|---|---|---|
| 444,849 | Germany | May 28, 1927 |